3,142,733
PRODUCTION OF HIGHLY POLYMERIC
LINEAR POLYESTERS
Max H. Keck, Cuyahoga Falls, Ohio, assignor to The Goodyear Tire & Rubber Company, Akron, Ohio, a corporation of Ohio
No Drawing. Filed June 2, 1959, Ser. No. 817,498
9 Claims. (Cl. 260—75)

This invention relates to the preparation of glycol esters of dicarboxylic acids. More particularly, this invention relates to the method of preparing superpolyesters by the alcoholysis of esters of dicarboxylic acids with a glycol and the subsequent polymerization of these glycol esters to highly polymeric linear polyesters.

In the preparation of linear superpolyesters, one of the most satisfactory methods from the standpoint of simplicity of reaction and economy of operation has been the ester interchange method in which esters of dicarboxylic acids are reacted with a glycol to form the diglycol ester of the acid or a low molecular weight polymeric polyester which is then polymerized to a high molecular weight polymeric polyester by a condensation reaction with splitting out of glycol. This process, however, has not been entirely satisfactory because the initial ester interchange reaction is slow and because many of the materials that catalyze this reaction are not effective as catalysts for the subsequent condensation reaction.

Heretofore various materials have been proposed as catalysts for the ester interchange reaction between the ester of dicarboxylic acids and glycols and for the subsequent polymerization or condensation reaction. Metals in the form of powder, chips, ribbon or wire have been suggested, as well as catalysts having a large surface area such as powdered glass or silica gel. The more successful of the catalysts used in the past, however, have been the alkaline materials such as the alkali metal and alkaline earth metal alcoholates, the alkali metal carbonates, or other alkaline reacting salts, alkaline earth oxides, and litharge.

Many of these materials are effective catalysts for the initial simple ester interchange, and some of them catalyze the condensation reaction. However, many of the substances that catalyze the condensation reaction carry the polymerization only to a low degree or they do not promote the reaction effectively enough to give reaction rates acceptable for a commercial process.

According to the present invention antimony tungstates, tungstic acid, borotungstic acid, tungsten hexachlordie, and tungsten carbonyl catalyze the ester interchange between glycols and esters of dicarboxylic acids, greatly accelerate the polymerization of bis glycol esters or low polymers thereof and permit the formation, in relatively short reaction times, of linear polyesters of high molecular weight which may be readily processed to form products having excellent properties.

The follownig examples illustrate the invention.

EXAMPLE 1

Thirty grams of dimethyl terephthalate, 20 grams of dimethyl isophthalate, 50 milliliters of ethylene glycol and 0.00085 gram of lead tungstate ($PbWO_4$) were placed in a small reaction flask. The mixture was heated at 197° C. and stirred at 200 r.p.m. by means of a propeller-type stirrer while a slow stream of oxygen-free nitrogen gas was passed through the reaction mixture. After one-half hour no methyl alcohol had been evolved so an additional 0.00085 gram of lead tungstate was added. After 45 minutes more reaction time, methanol had not been evolved, so an additional 0.0017 gram of lead tungstate was added. The mixture was heated for an additional hour and fifteen minutes in which time 0.02 milliliter of methanol evolved. The reaction was discontinued.

EXAMPLE 2

Thirty grams of dimethyl terephthalate, 20 grams of dimethyl isophthalate and 50 milliliters of ethylene glycol were placed in a small reaction flask. Then 0.034 gram of lead tungstate was added. The mixture was heated at 197° C. and stirred at 200 r.p.m. by means of a propeller-type stirrer while a slow stream of oxygen-free nitrogen gas was passed through the reaction mixture. At the end of one hour and twenty-five minutes, 20.5 milliliters of methanol had distilled out and the ester interchange reaction was substantially complete. The mixture was heated for an additional hour. Then the temperature was raised to 244° C. and the mixture was heated for one hour to distill out unreacted glycol. The temperature was then raised to 273° C. and the pressure reduced to 1 millimeter of mercury pressure. After one hour and twenty minutes of reaction under these conditions, a viscous polymer having a medium olive green color was formed. The polymer had an intrinsic viscosity of 0.625.

EXAMPLE 3

To a mixture of 30 grams of dimethyl terephthalate, 20 grams of dimethyl isophthalate and 50 milliliters of ethylene glycol, 0.0375 gram of tungstic acid ($H_2WO_4$) was added. The mixture was then heated at 197° C. and stirred at 200 r.p.m. by means of a propeller-type stirrer while a slow stream of nitrogen gas was passed through the reaction mixture. Heating was continued for one hour. No methanol was evolved.

EXAMPLE 4

To a small reaction vessel containing 17.116 grams of bis betahydroxyethyl terephthalate which had been purified by recrystallization 0.0021 gram of tungstic acid ($H_2WO_4$) was added. The mixture was heated at 244° C. and stirred with a propeller-type stirrer at 200 r.p.m. while a slow stream of nitrogen gas was passed through the reaction mixture. After 25 minutes of heating and stirring at 244° C., the temperature was raised to 273° C. and the pressure reduced to 1 millimeter of mercury pressure. After one hour and fifteen minutes of reaction under these conditions, a polymer having an intrinsic viscosity of 0.643 was formed. The polymer had a medium yellowish-brown color.

Various compounds were tested as catalysts for the preparation of polyesters using, as a master batch, material prepared by the ester interchange reaction of dimethyl terephthalate with ethylene glycol according to the procedure in Example 5.

EXAMPLE 5

A 2-liter 3-neck flask was fitted with stirrer, nitrogen inlet, and Claisen head. One thousand grams of dimethyl terephthalate, 750 milliliters of ethylene glycol, and 0.5 gram of manganous acetate were placed in the flask. The mixture was slowly heated until the vapor temperature had risen to 190° C. and then it was heated for 30 minutes more at this temperature; 555 milliliters of methanol were collected. The product was poured into a stainless steel pan, broken into small pieces and stored in a dry bottle.

The product prepared in Example 5 was used for testing the compounds as catalysts for the condensation polymerization reaction by which highly polymeric ethylene terephthalate is formed from bis beta hydroxy ethyl terephthalate or low polymers of bis beta hydroxy ethyl terephthalate. The following procedure was used as a standard testing method.

Twenty-five grams of the product prepared in Example 5, containing manganous acetate, were placed in a 37- millimeter (outside diameter) glass reaction tube equipped with a hollow shaft propeller-type stirrer. Then 0.010 gram of the compound being tested for catalytic activity was added. The mixture was heated and stirred at 197° C. at one millimeter of mercury pressure and nitrogen gas was slowly passed through the mixture through the shaft of the propeller. After about 20 minutes under these conditions the temperature was raised to 280° C. and the flow of nitrogen gas through the mixture was stopped. After 1.5 hours at 280° C. and one millimeter of mercury pressure the reaction was stopped and the viscosity of the polymer determined.

Data obtained in these experiments are tabulated in Table 1.

*Table I*

| Example | Catalyst | Intrinsic Viscosity |
|---|---|---|
| 6 | Control—no additional catalyst | 0.586 |
| 8 | +.05% $Nd_2(WO_4)_3 \cdot nH_2O$ | 0.721 |
| 9 | +.05% $WO_3 \cdot H_2O$ | 0.784 |
| 11 | +.05% $CuWO_4$ | 0.792 |

For other tests on tungsten compounds as catalysts for the preparation of polyesters a master batch of material was prepared by the ester interchange reaction of a 60/40 mixture of dimethyl terephthalate and dimethyl isophthalate with ethylene glycol. The following example shows the preparation of this material.

EXAMPLE 12

Seven thousand one hundred grams of a 60/40 dimethyl terephthalate-dimethyl isophthalate mixture; 4,540 grams of ethylene glycol; 2.13 grams of zinc acetate; and 0.355 gram of manganous acetate were placed in a 12-liter flask. The mixture was heated for 6 to 7 hours, the temperature being slowly raised from room temperature to a terminal temperature of 200° C. Methanol distilled out of the mixture first and then glycol distilled out. The reaction mixture was transferred to a smaller flask and heated over an 8-hour period, the pressure being reduced from atmospheric pressure to 25 millimeters of mercury pressure and the temperature being slowly raised from room temperature to 250° C. The resulting material was a glassy solid having an acid number of about 2.7.

The product prepared in Example 12 was used for testing the effectiveness of tungsten compounds as catalysts for the condensation polymerization reaction by which highly polymeric polyesters are prepared. The procedure of Example 13 below was used as a testing procedure.

EXAMPLE 13

A small reaction tube was charged with 50 grams of the product prepared in Example 12. The compound being tested for catalytic activity was added. The mixture was heated at 244° C. by means of a vapor bath, the vapors being kept level with the top of the reaction mixture so that ethylene glycol would not distill out. The mixture was stirred at approximately 200 r.p.m. while a slow stream of nitrogen was passed through the reaction mixture. After 15 minutes of heating at 244° C. the pressure was gradually reduced, the reduction being carried out at such a rate that the pressure dropped from 760 millimeters of mercury pressure to 1 millimeter of mercury pressure over a 15 minute period. At the beginning of the reduction of the pressure the bath vapors were raised to the top of the reactor tube so that glycol would distill out of the reaction mixture. At the end of the period during which the pressure was reduced to one millimeter of mercury pressure, the vapor bath was changed to another having a boiling point of 273° C. and bubbling of the nitrogen gas through the reaction mixture was discontinued. The reaction was stopped after one and one-half hours at 273° C. and one millimeter of mercury pressure, the color of the polyester was noted and the intrinsic viscosity was measured.

Data obtained in these experiments are tabulated in Table 2.

*Table 2*

| Example | Catalyst | Grams of Catalyst per 50 g. Low Polymer | Melt Color | Intrinsic Viscosity |
|---|---|---|---|---|
| 14 | $WO_3 \cdot H_2O$ | 0.0375 | Clear medium green | 0.715 |
| 15 | $WO_3 \cdot H_2O$ | 0.0250 | Clear light green | 0.748 |
| 16 | $WO_3 \cdot H_2O$ | 0.0125 | do | 0.803 |
| 17 | $WO_3 \cdot H_2O$ | 0.0062 | Clear light yellow | 0.799 |
| 18 | $WO_3 \cdot H_2O$ | 0.0031 | Clear yellow | 0.782 |
| 23 | $WCl_6$ | 0.0282 | Clear light green | 0.691 |
| 24 | $W(CO)_6$ | 0.0035 | Clear pale yellow | 0.828 |
| 25 | $W(CO)_6$ | 0.0017 | do | 0.754 |
| 26 | $PbWO_4$ | 0.0034 | Clear light yellow | 0.819 |
| 27 | $PbWO_4$ | 0.0017 | do | 0.796 |
| 28 | $PbWO_4$ | 0.00034 | do | 0.746 |
| 29 | $PbWO_4$ | 0.00017 | Clear pale yellow | 0.682 |
| 30 | $Bi_2(WO_4)_3$ | 0.0009 | Clear pale yellowish brown. | 0.730 |
| 31 | $Bi_2(WO_4)_3$ | 0.0003 | Clear almost water-white | 0.642 |
| 32 | $Cr_2(WO_4)_3$ | 0.0028 | Clear very pale yellow | 0.772 |
| 33 | $Cd_5(BW_{12}O_{40})_2 \cdot 18H_2O$ | 0.0137 | Clear green | 0.777 |
| 34 | $Cd_5(BW_{12}O_{40})_2 \cdot 18H_2O$ | 0.0030 | Clear yellow | 0.726 |
| 35 | $Cd_5(BW_{12}O_{40})_2 \cdot 18H_2O$ | 0.0020 | Clear pale yellow | 0.694 |
| 36 | $Cd_5(BW_{12}O_{40})_2 \cdot 18H_2O$ | 0.0010 | Clear water-white | 0.617 |
| 37 | $ZnWO_4$ | 0.0045 | Yellow | 0.83 |
| 38 | $ZnWO_4$ | 0.0015 | Clear pale yellow | 0.521 |
| 39 | $Fe_2(WO_4)_3$ | 0.0012 | Light greenish yellow | 0.876 |
| 41 | $Nd_2(WO_4)_3 \cdot nH_2O$ | 0.0344 | Clear pale yellow | 0.681 |
| 43* | $Sb_2O_3 \cdot 3WO_3$ | 0.0078 | Very light yellow (slightly turbid). | 0.828 |
| 44* | $Sb_2O_3 \cdot 3WO_3$ | 0.0052 | do | 0.825 |
| 45* | $Sb_2O_3 \cdot 3WO_3$ | 0.0036 | do | 0.820 |
| 46* | $Sb_2O_3 \cdot WO_3$ | 0.0026 | do | 0.761 |
| 47** | $Sb_2O_3 \cdot 3WO_3$ | 0.005 | do | 0.889 |
| 48** | $Sb_2O_3 \cdot 3WO_3$ | 0.0035 | do | 0.859 |
| 49 | Physical mixture of $Sb_2O_3$ and $H_2WO_4$(1:3). | 0.0036 | Much darker than Example #45. | 0.830 |
| 50 | $3Sb_2O_3 \cdot 5WO_3$ | 0.0075 | Light yellow (hazy) | 0.839 |
| 51 | $3Sb_2O_3 \cdot 5WO_3$ | 0.0050 | Very light yellow (hazy) | 0.798 |
| 52 | $3Sb_2O_3 \cdot 5WO_3$ | 0.0035 | do | 0.765 |
| 53 | $Sb_2O_3 \cdot 5WO_3$ | 0.0050 | Light yellow (hazy) | 0.815 |
| 54 | Glycol titanate (control) | 0.0012 | Clear yellow | 0.768 |
| 55 | No 2nd stage catalyst (control). | | Clear very pale yellow | 0.564 |

*Antimony tungstate tested as a catalyst in Examples 43 through 46 was prepared as follows:

EXAMPLE 56

Seven and one-half grams of tungstic acid ($H_2WO_4$) and 2.9 grams of antimony trioxide ($Sb_2O_3$) were weighed into a porcelain crucible. The two solids were dry-mixed and then heated over a Fisher burner for fifteen minutes. The color of the mixture changed from yellow to olive green to dark orange but the mixture did not melt. The crucible was then heated with an oxygen torch. The mixture frothed and then melted. After twenty minutes of heating, the mixture was cooled to room temperature. The product was a grayish-black metallic color solid. A slight amount of unmelted yellow powder remaining around the rim of the crucible was brushed away. The fusion product was removed from the crucible and ground to a fine powder. A stock solution of the powder was prepared by dissolving 0.0522 gram of the powder in 100 cc. of ethylene glycol. A measured portion of the glycol solution containing the amount of antimony tungstate required was used to supply the antimony tungstate catalyst used in Examples 43–46 in Table 2.

**The antimony tungstate ($Sb_2O_3.WO_3$) tested as catalyst in Examples 47 and 48 was prepared as follows:

EXAMPLE 57

Twenty-two and one-half grams of sodium chloride, 11.5 grams of antimony trioxide and 4.35 grams of tungstic acid were mixed in a porcelain crucible and heated for 25 minutes with a Fisher burner and then for 15 minutes with an oxygen torch. The fused mixture was cooled, ground to a powder, and washed with distilled water to remove the salt. The powder was then dried and sifted through a 325-mesh screen. The powder was dissolved in glycol. A portion of the glycol solution was used to supply the catalyst in Examples 47 and 48.

As a control for the antimony tungstate catalysts tested in Table 2, a physical mixture of antimony trioxide and tungstic acid was made in which the ratio of antimony trioxide and tungstic acid was equivalent to that used in the fusion mixture. A solution of this physical mixture in ethylene glycol was used as the control catalyst. In Example 49 glycol solution containing 0.0036 gram of the mixture was used.

The antimony paratungstate ($3Sb_2O_3.5WO_3$) tested in Examples 50 through 52 was prepared by fusing 1.75 grams of antimony trioxide with 2.50 grams of tungstic acid according to the procedure used in Example 56. The fusion product was dissolved in glycol. A portion of the glycol solution was used to supply the catalyst in the experiments indicated.

EXAMPLE 58

The antimony pentatungstate ($Sb_2O_3.5WO_3$) tested in Example 53 was prepared by heating 25 grams of NaCl, 2.91 grams of antimony trioxide and 12.5 grams of tungstic acid in a porcelain crucible for 25 minutes with a Fisher burner and then for 15 minutes with an oxygen torch. The fused mixture was cooled, ground to a powder and washed with distilled water to remove the salt. The powder was then dried and sifted through a 325-mesh screen. The powder was dissolved in glycol. A portion of the glycol solution was used to supply the catalyst in Example 53.

Antimony tungstates can also be prepared by low temperature fusion of antimony trioxide and tungstic acid as in the following example:

EXAMPLE 59

Two and twenty-five hundredths grams of tungstic acid, 0.87 g. of antimony trioxide, and 4.50 g. of sodium chloride were heated in a porcelain crucible with a Fisher burner for 15 to 20 minutes using an inverted crucible as a lid. The fused mixture was cooled, ground to a powder and washed with distilled water to remove the salt. The powder was then dried and sifted through a 325-mesh screen. The antimony tungstate ($Sb_2O_3.3WO_3$) thus prepared was much lighter in color than the antimony tungstate ($Sb_2O_3.3WO_3$) prepared as described in Examples 56 and 57.

This material was tested for catalytic action using a batch of low molecular weight polymer which was prepared by the method of Example 12. For comparison, titanium tungstate and glycol titanate were also checked as catalysts on a different sample of the same batch of low molecular weight polymer. The data are tabulated in Table 3 below:

Table 3

| Example | Catalyst | Grams of Catalyst per 50 g. Low Polymer | Melt Color | Intrinsic Viscosity |
|---|---|---|---|---|
| 60 | $Sb^2O^3.3WO^3$ | 0.005 | Clear pale yellow. | 0.742 |
| 61† | $Ti(WO_4)$ | 0.007 | Clear very pale yellow. | 0.672 |
| 62 | Glycol titanate (Control for examples 56 and 57 only). | 0.0012 | Clear medium | 0.603 |

† The titanium tungstate used in Example 61 was prepared as follows:

EXAMPLE 63

One and twenty-four one-hundredths grams of titanium tetrafluoride were dissolved in 20 milliliters of water. The solution was filtered. The filtrate was added with stirring to a solution of 2.94 grams of sodium tungstate dissolved in 20 milliliters of water. A precipitate of titanium tungstate formed immediately. The precipitate was filtered into a funnel, washed with water and then with methyl alcohol to remove sodium fluoride formed. It was then dried at 80° C. for 2 hours. The dry, finely-divided solid obtained was used as catalyst in Example 61.

Antimony trioxide and tungstic acid can be fused in various ratios to form different antimony tungstates. These products vary from pure compounds to mixtures of the different antimony salts. Ordinary salt (NaCl) acts as a flux to facilitate the reaction between antimony trioxide and tungstic acid and it was used in some of the above examples for this purpose. The already known antimony salts of tungstic acid are named in this specification as they are named in the literature. Antimony salts not previously recorded in the literature are named by analogy to similar salts of tungstic acid with other materials.

The practice of the invention has been illustrated with particular respect to the preparation of polymeric ethylene terephthalate and to the preparation of polymeric ethylene terephthalate and to the preparation of a polymeric 60/40 ethylene terephthalate-ethylene isophthalate copolyester. Polymeric ethylene isophthalate and copolyesters containing various ratios of ethylene terephthalate to ethylene isophthalate can similarly be made using the catalysts of the invention.

In the production of highly polymeric polyester from bis esters and a glycol such as the dimethyl phthalate esters and ethylene glycol, the tungsten compounds can act as catalyst for the initial ester interchange reaction when used in sufficient amount. The compounds are more effective as catalysts in the condensation polymerization reaction, however, than they are in the initial ester interchange reaction and are used in much smaller amounts for the condensation reaction. Thus the tungsten compounds can be added to a mixture of bis esters of the acids and a glycol and the ester interchange and condensation reactions then carried out to prepare the polymeric polyester. If desired, the bis glycol esters can be prepared by ester interchange or other suitable method and the tungsten compound added to the bis glycol esters and the condensation polymerization then carried out to prepare the polymer. Also, if desired, the tungsten compound can be added to a low molecular weight polymer of the bis glycol ester or to a mixture of low molecular weight polymer and bis glycol ester of the acids and the polymerization reaction carried out to prepare the polymeric polyester. Generally, it is desirable to keep the catalyst concentration low because high catalyst concentrations contribute to polymer instability and impart color to the product. It is preferred, therefore, that the tungsten compound be used in conjunction with another material which acts as an ester interchange catalyst. Representative examples of catalysts that are effective for the initial ester interchange reaction are zinc acetate, manganous acetate, calcium acetate, and litharge.

In the production of the highly polymeric polyester from bis glycol esters such as bis betahydroxyethyl terephthalate or bis betahydroxyethyl isophthalate or mixtures of these materials, the tungsten compound can be used as the sole catalyst for the condensation reaction. If desired, however, small amounts of another catalyst can be added to increase the rate of the condensation reaction and to assist in obtaining a polyester of high viscosity in shorter reaction times.

Representative examples of catalysts of the invention are antimony tungstates such as antimony tungstate, antimony paratungstate and antimony pentatungstate, tungstic acid, zinc tungstate, cadmium tungstate, bismuth tungstate, chromium tungstate, lead tungstate, ferric tungstate, copper tungstate, titanium tungstate, neodymium tungstate, and nickel tungstate, borotungsic acid, and salts of borotungstic acid such as cadmium borotungstate, bismuth borotungstate, lead borotungstate, zinc borotungstate, calcium borotungstate, and magnesium borotungstate.

The amount of the catalyst used may be varied over wide concentrations. As is usual in catalysts the amount will be relatively small. As a general rule the amount will be within the range of from .0003 to 0.10% based on the dialkyl phthalate used. The preferred range is from 0.0005 to 0.08% based on the phthalate ester used to give a satisfactory reaction rate and a product of suitable viscosity and color.

In the practice of the invention the preparation of the glycol esters and the polymerization reaction are, in general, carried out in accordance with the usual known techniques. Thus, the reactions are preferably carried out in the absence of oxygen, generally, in an atmosphere of an inert gas such as nitrogen or the like in order to lessen darkening and to make it possible to obtain a high molecular weight pale or colorless product. Bubbling the inert gas through the reacting mixture serves the added functions of agitation and of expediting the removal of volatile components formed by the reaction. The polymerization or condensation reaction is carried out under reduced pressure, generally below 10 millimeters of mercury pressure and usually at or below 1 millimeter of mercury pressure at a temperature in the range of from 260 to 290° C.

The examples illustrate the invention particularly with respect to the dimethyl esters and ethylene glycol. The catalysts of the invention are effective with other esters such as the ethyl, propyl, butyl, and phenyl esters of the phthalic acids, and with esters of other aromatic and aliphatic acids. Representative examples of esters of such other acids are esters of phthalic acid, hexahydroterephthalic acid, the naphthalic acids, adipic acid, pimelic acid, suberic acid, azelaic acid and sebacic acid. Esters of one acid or mixtures of esters of two or more acids may be used. Glycols can be used individually or in mixtures. Representative examples of glycols are ethylene glycol; the propylene glycols; the butylene glycols; pentane diol 1,5; hexanediol; 2,2, dimethyl-1,3-propane diol; 2,2-diethyl-1,3-propane diol; diethylene glycol and other glycols such as 1,4-cyclohexane dimethanol; 1,4-phenyl dimethanol and 2,2-bis [4-(beta-hydroxy ethyl) phenyl] propane can also be used. Ethylene glycol is the preferred glycol because of its low cost and ready availability.

The catalysts of this invention can also be used in condensation reactions of the type in which the glycol in a glycol diester of a dicarboxylic acid is displaced by a higher boiling glycol as illustrated by the reaction of bis betahydroxy ethyl terephthalate with 2,2-bis [4-(beta-hydroxyethoxy)phenyl] propane to form copolymers containing the repeating units (A)

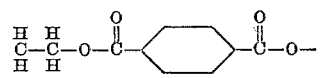

and (B)

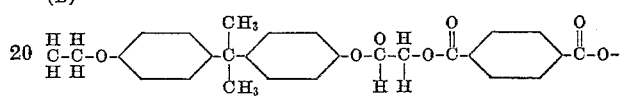

While certain representative embodiments and details have been shown for the purpose of illustrating the invention, it will be apparent to those skilled in this art that various changes and modifications may be made therein without departing from the spirit or scope of the invention.

I claim:

1. In a process for preparing a highly polymeric linear polyester by subjecting at least one bis ester selected from the group consisting of methyl, ethyl, propyl, butyl and phenyl esters of an acid selected from the group consisting of terephthalic acid and isophthalic acid to alcoholysis in the presence of a glycol and thereafter subjecting the glycol ester formed to self-condensation with the removal of glycol the improvement which comprises carrying out both the alcoholysis and condensation in the presence of a catalytic amount of a compound selected from the group consisting of tungstic acid, tungsten hexachloride, tungsten carbonyl, lead tungstate, bismuth tungstate, chromium tungstate, cadmium tungstate, zinc tungstate, iron tungstate, antimony tungstate, antimony paratungstate, borotungstic acid and cadmium borotungstate.

2. In a process for preparing a highly polymeric linear polyester by the self-condensation with the removal of glycol of a bis glycol ester of at least one acid selected from the group consisting of terephthalic acid and isophthalic acid, the improvement which comprises carrying out said condensation in the presence of a catalytic amount of a compound selected from the group consisting of tungstic acid, tungsten hexachloride, tungsten carbonyl, lead tungstate, bismuth tungstate, chromium tungstate, cadmium tungstate, zinc tungstate, iron tungstate, antimony tungstate, antimony paratungstate, borotungstic acid and cadmium borotungstate.

3. In a process for preparing a highly polymeric linear polyester by the self-condensation with the removal of glycol of a bis ethylene glycol ester of at least one acid selected from the group consisting of terephthalic acid and isophthalic acid, the improvement which comprises carrying out said condensation in the presence of a catalytic amount of a compound selected from the group consisting of tungstic acid, tungsten hexachloride, tungsten carbonyl, lead tungstate, bismuth tungstate, chromium tungstate, cadmium tungstate, zinc tungstate, iron tungstate, antimony tungstate, antimony paratungstate, borotungstic acid and cadmium borotungstate.

4. The process of claim 1 in which the bis ester used is the dimetyl ester.

5. In a process for preparing a highly polymeric linear copolyester by the self-condensation with the removal of ethylene glycol of a mixture of bis ethylene glycol terephthalate and bis ethylene glycol isophthalate, the improvement which comprises carrying out said condensation in the presence of a catalytic amount of a compound selected from the group consisting of tungstic acid, tungsten hexachloride, tungsten carbonyl, lead tungstate, bismuth tungstate, chromium tungstate, cadmium tungstate, zinc tungstate, iron tungstate, antimony tungstate, antimony paratugstate, borotungstic acid and cadmium borotungstate.

6. A process according to claim 3 in which the condensation reaction is carried out at about 1 millimeter of mercury pressure at a temperature in the range of from 260 to 290° C.

7. In a process for preparing highly polymeric linear polyesters by the polymerization with the removal of glycol of bis glycol esters of dicarboxylic acids, the improvement which comprises mixing with said bis esters a catalytic amount of a compound selected from the group consisting of tungstic acid, tungsten hexachloride, tungsten carbonyl, lead tungstate, bismuth tungstate, chromium tungstate, cadmium tungstate, zinc tungstate, iron tungstate, antimony tungstate, antimony paratungstate, borotungstic acid and cadmium borotungstate, and subjecting the bis glycol esters to condensation with the removal of glycol.

8. A process according to claim 3 in which the catalyst used is antimony paratungstate.

9. A procee according to claim 3 in which the catalyst used is lead tungstate.

References Cited in the file of this patent

UNITED STATES PATENTS

| 2,197,855 | Ellis | Apr. 23, 1940 |
| 3,036,043 | Gruschke | May 22, 1962 |

FOREIGN PATENTS

| 791,790 | Great Britain | Mar. 12, 1958 |